(12) United States Patent
Wang

(10) Patent No.: US 7,681,081 B2
(45) Date of Patent: Mar. 16, 2010

(54) TEST DEVICE AND METHOD FOR TESTING STABILITY OF COMPUTER

(75) Inventor: Yong-An Wang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 683 days.

(21) Appl. No.: 11/309,702

(22) Filed: Sep. 15, 2006

(65) Prior Publication Data

US 2008/0082848 A1 Apr. 3, 2008

(51) Int. Cl.
G06F 11/00 (2006.01)
(52) U.S. Cl. .................................................. 714/36
(58) Field of Classification Search ................ 714/36
See application file for complete search history.

(56) References Cited

U.S. PATENT DOCUMENTS

| | | | | |
|---|---|---|---|---|
| 4,646,299 A | * | 2/1987 | Schinabeck et al. | 714/736 |
| 5,875,293 A | * | 2/1999 | Bell et al. | 714/27 |
| 6,163,847 A | | 12/2000 | Yoon et al. | |
| 2002/0005730 A1 | * | 1/2002 | Heiman et al. | 324/765 |
| 2003/0009715 A1 | * | 1/2003 | Ricchetti et al. | 714/727 |
| 2003/0226076 A1 | * | 12/2003 | Kang et al. | 714/724 |
| 2005/0270370 A1 | * | 12/2005 | Uemura et al. | 348/79 |
| 2007/0168738 A1 | * | 7/2007 | Wang | 714/36 |
| 2008/0155244 A1 | * | 6/2008 | Shih | 713/2 |
| 2008/0172578 A1 | * | 7/2008 | Tsai | 714/36 |

OTHER PUBLICATIONS

Atmel Corporation, AT89S51, Dec. 2003, Atmel, Rev A.*

* cited by examiner

*Primary Examiner*—Scott T Baderman
*Assistant Examiner*—Yair Leibovich
(74) *Attorney, Agent, or Firm*—Wei Te Chung

(57) ABSTRACT

A test device is provided for testing stability of a computer when the computer is started up or shut down. The test device includes a monolithic chip and a switch module. The monolithic chip includes an input port and an output port. The input port receives a high level or a low level signal from the computer. A test control module is disposed in the monolithic chip. The switch module includes an input pin coupled to the output port of the monolithic chip and a pair of output pins corresponding to the input pin. The pair of output pins is connected to the computer, for controlling the computer to be started up or shut down. The input port of the monolithic chip is connected to the computer for detecting a state of the computer.

9 Claims, 2 Drawing Sheets

TEST DEVICE AND METHOD FOR TESTING STABILITY OF COMPUTER

FIELD OF THE INVENTION

The present invention relates to test devices and methods, more particularly to a test device and method for testing stability of computers.

DESCRIPTION OF RELATED ART

After a computer is produced, quality tests are required. One of the tests is for testing stability of the computer when the computer is turned on or turned off. In testing, the computer is powered on and off alternately, for testing whether the computer can be started up or be shut down normally.

A conventional test fashion is connecting the computer to an AC power source, and then manually pushing a power button on the computer repeatedly to force the computer to be started up or shut down. If the computer cannot be started or shut down normally, a further check is needed to find the problem. However, because a great number of computers need to be tested in the manufacturing process, manually testing the computer is inefficient and a waste of manpower.

What is needed, therefore, is a test device and method that automatically controls the computers to be powered on and off repeatedly.

SUMMARY OF THE INVENTION

A test device is provided for testing stability of a computer when the computer is started up or shut down. A motherboard of the computer generates a high level signal when the computer is started up, and a low level signal when the computer is shut down. The test device includes a monolithic chip and a switch module. The monolithic chip includes an input port and an output port. The input port receives the high level or low level signal from the computer. A test control module is disposed in the monolithic chip. The switch module includes an input pin coupled to the output port of the chip and a pair of output pins corresponding to the input pin. The pair of output pins is connected to the computer, for controlling the computer to be started up or shut down. The input port of the chip is connected to the computer for detecting a state of the computer, when the input port of the chip receives a low level signal, the test control module controls the output pin of the chip to output a starting up signal to the switch module; when the input port of the chip receives a high level signal, the test control module controls the output pin of the chip to output a shutting down signal to the switch module.

Other advantages and novel features will be drawn from the following detailed description of preferred embodiments with attached drawings, in which:

DETAILED DESCRIPTION OF THE INVENTION

Figure 1:
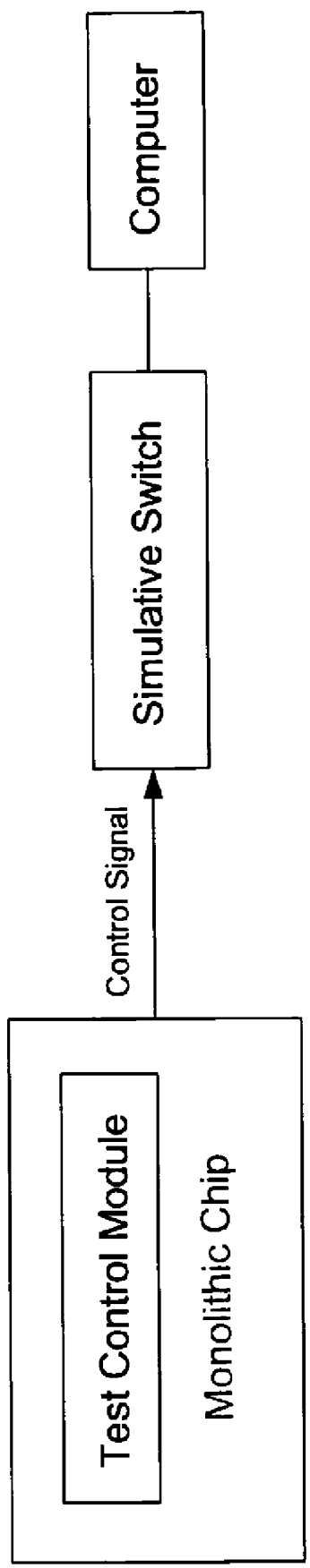
FIG. 1 is a block diagram of working principle of the test device in accordance with a preferred embodiment of the present invention.

Referring to FIG. 1, the working principle of a testing device for testing stability of computers when the computer is started up and shut down in accordance with a preferred embodiment is described as follows: a test control module is disposed in a monolithic chip; the monolithic chip sends a control signal according to the indication of the test control module to a simulative switch which is connected to a computer, for controlling the simulative switch to start up or shut down the computer.

Figure 2:
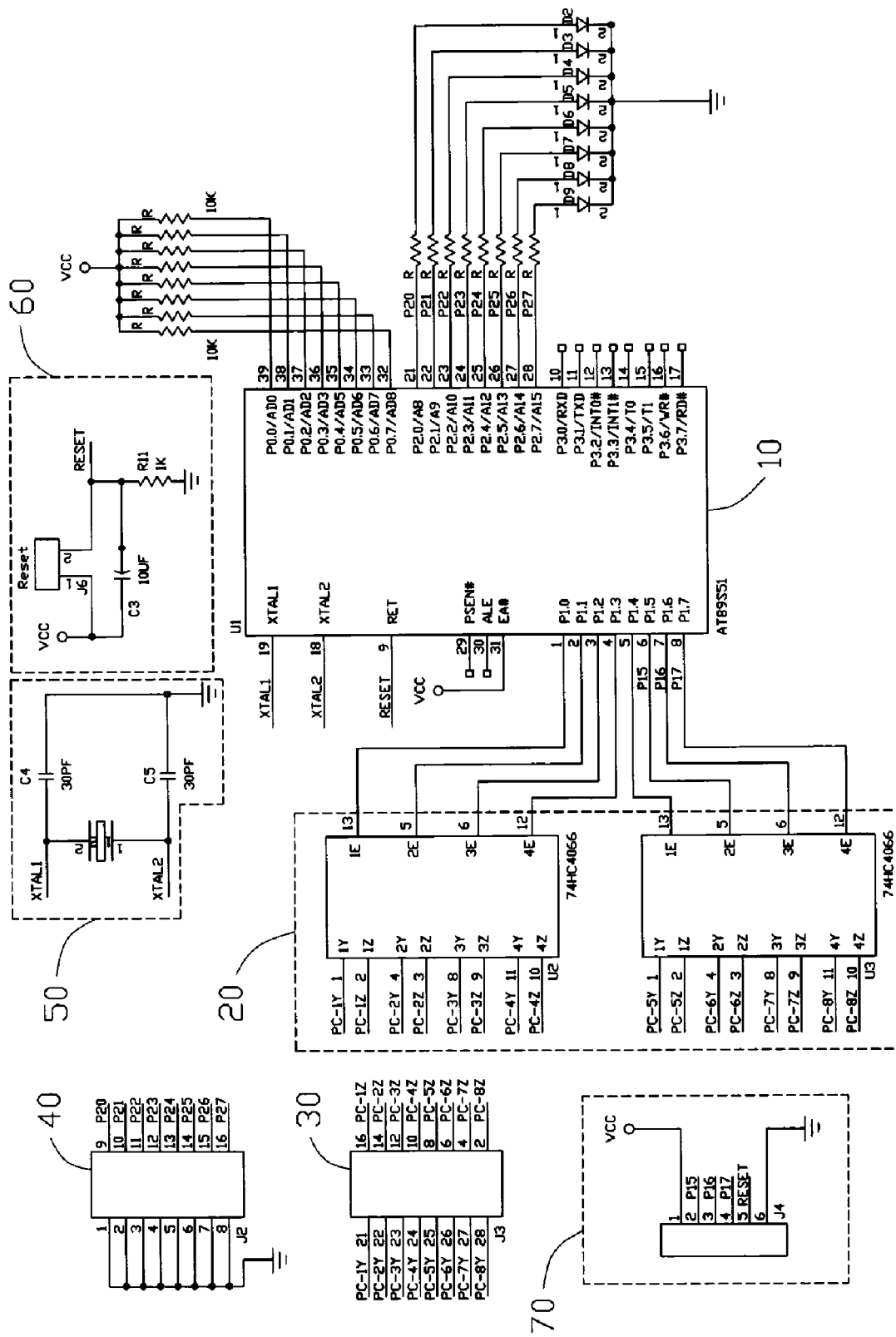
FIG. 2 is a circuit diagram of the test device in accordance with a preferred embodiment of the present invention.

Referring also to FIG. 2, the testing device in accordance with a preferred embodiment is used for testing stability of computers while the computers are turned on or turned off. A motherboard of each computer includes 2 first pins for controlling the computer to be started up or shut down and a second pin for generating a signal when the computer is started up or shut down. The test device includes a monolithic chip 10, a switch module 20, a first connector 30, a second connector 40, a crystal oscillator circuit 50, a reset circuit 60, and an ISP (In-System Programming) module 70.

The monolithic chip 10 is an AT89S51 microcontroller, which includes 4 ports P0 (P0.0-P0.7), P1 (P1.0-P1.7), P2 (P2.0-P2.7) and P3 (P3.0-P3.7). Each port includes 8 pins. The monolithic chip 10 also includes a pair of pins XTAL1 and XTAL2 connected to the crystal oscillator circuit 50, a pin RET connected to the reset circuit 60, and a pin EA# coupled to a power source VCC (+5V) provided by the motherboard of the tested computer.

The switch module 20 includes two 74HC4066 chips. Each 74HC4066 chip includes 4 input pins 1E, 2E, 3E, 4E for input control signals and 4 pairs of output pins 1Y, 1Z; 2Y, 2Z; 3Y, 3Z; 4Y, 4Z for connecting with the first connector 30. Each input pin corresponds to a pair of the output pins. For instance, the pin 1E corresponds to the pair of output pins 1Y and 1Z.

The first connector 30 includes 8 pairs of switch pins respectively connected to the first pins of motherboards of 8 computers to be tested, and the output pins of the 74HC4066 chips of the switch module 20 are thus respectively connected to the computers via the connector 30.

The second connector 40 includes 16 pins. Pins 1-8 are connected to ground. Pins 9-16 are respectively connected to the second pins of the 8 computer motherboards. When the computers are started, the second pins of the 8 computers respectively generate a +5V voltage. After the computers are shut down, the voltage at the second pins is zero.

The crystal oscillator circuit 50 includes a quartz-crystal and two inching capacitors. The monolithic chip 10 having an inverting amplifier is electronically coupled to the crystal oscillator circuit 50, forming a self-oscillator generating impulse signals.

The reset circuit 60 inputs a reset signal to the monolithic chip 10. The reset signal is valid when it is at high level more than two machine cycles of the monolithic chip 10, to control initialization of the monolithic chip 10.

The ISP module 70 includes 6 pins. Pins 1 and 6 are respectively connected to the power source VCC and ground. Pins 2-4 are connected to the monolithic chip 10. Pin 5 is coupled to the reset circuit 60. The ISP module 70 is used for downloading the test control module to the monolithic chip 10.

A detailed description of a relationship between the chip 10 and other circuits follows:

The pins P0.0-P0.7 of the port P0 are respectively connected to resistors R (ohmic value of about 10 k) coupled to the power source VCC. The pins P1.0-P1.3 of the port P1 are respectively connected to input pins 1E, 2E, 3E, and 4E of one of the 74HC4066 chip. The pins P1.4-P1.7 of the port P1 are respectively connected to input pins 1E, 2E, 3E, and 4E of the other 74HC4066. Each input pin of the 74HC4066 chips corresponds to a pair of output pins thereof. The 8 pairs of output pins of the 74HC4066 chips are respectively connected to the 8 pairs of switch pins of the first connector 30. When the voltage at the input pins of the 74HC4066 chip is high level, the corresponding pairs of output pins are inter-communicated. When the voltage at the input pins of the 74HC4066 chip are low level, the communication between the corresponding pairs of output pins is cut off. The pins P1.0-P1.7 of the port P1 of the monolithic chip 10 output high level signals to the input pins of the 74HC4066 chip for starting up/shutting down the computers. When the high level signals last a first determined time, the 74HC4066 chip is triggered to start up the computers. When the high level signals last a second determined time, the 74HC4066 chip is triggered to shut down the computers.

The pins P1.5, P1.6 and P1.7 are also respectively connected to pins 2-4 of the ISP module 70, for downloading a test control module to the monolithic chip 10.

Each pin of the port P2 of the monolithic chip 10 is coupled to an anode of a light emitting diode via a protection resistor R. The pins P2.0-P2.7 are also respectively coupled to pins 9-16 of the second connector 40, for receiving an input signal (a +5V/0V voltage signal). The cathodes of the light emitting diodes are connected to ground. When the computers are started up, each pin of the port P2 of the monolithic chip 10 receives a high level (+5V voltage) signal from the second connector 40. The light emitting diodes are lit to indicate that the computers are started up. When the computers are shut down, each pin of the port P2 of the monolithic chip 10 receives a low level (0V voltage) signal from the second connector 40.

The tested computers are coupled to a 220V AC power source. The monolithic chip 10 is initialized to test the stability of the computers. In testing, the monolithic chip 10 detects the states of the pins P2.0-P2.7 repeatedly. If the signal at a certain pin of the port P2 is at a low level, indicating that the corresponding computer coupled to the pin hasn't been started. The certain pin of the port P1 corresponding with the unstarted computer outputs a first incessant high level signal to the corresponding input pin of the 74HC4066 chip. Then, the pair of output pins of the 74HC4066 chip corresponding with the input pin are intercommunicated. The 74HC4066 chip is triggered to start up the computer. The first incessant high level signal is ended when the monolithic chip 10 detects appearance of a high level signal at the port P2 thereof. After the computer runs a time determined by the test control module in the monolithic chip 10, another incessant high level signal is output to the 74HC4066 chip for shutting down the computer. The incessant high level signal is ended when the monolithic chip 10 detects appearance of a low level signal at the port P2 thereof. The retaining time of the signal for starting up/shutting down the computers, the shift time between the starting signal and shutting down signal, and loop times can be changed through editing the test control module. The edited test control module is then downloaded to the monolithic chip 10 via the ISP module 70.

In testing, if the computers can not be started up or shut down according to the test control module, the stability of the computers is considered unqualified. A further check of the computers is needed. After the test process is finished, a test result is shown on an indicator coupled to the monolithic chip 10.

It is to be understood, however, that even though numerous characteristics and advantages have been set forth in the foregoing description of preferred embodiments, together with details of the structures and functions of the preferred embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A test device for testing stability of at least one computer when the computer is staffed up or shut down, a motherboard of the computer generating a high level signal when the computer is staffed, and generating a low level signal when the computer is shut down, comprising:
   a monolithic chip comprising an input port and an output port, the input port receiving the high level or low level signal from the computer, a test control module disposed in the monolithic chip;
   an in-system programming module connected to the monolithic chip, the in-system programming module is configured to edit the testing control module when the computer is being tested and to input the testing control module into the monolithic chip; and
   a switch module comprising an input pin coupled to the output port of the chip and a pair of output pins corresponding to the input pin, the pair of output pins connected to the computer, for controlling the computer to be started up or shut down;
   wherein the input port of the monolithic chip is configured for connecting to the computer for detecting a state of the computer, when the input port of the monolithic chip receives a low level signal, the test control module controls the output pin of the monolithic chip to output a starting signal to the switch module for starting the computer; when the input port of the monolithic chip receives a high level signal, the test control module controls the output pin of the monolithic chip to output a shutting down signal to the switch module for shutting down the computer.

2. The test device for testing stability of at least one computer as described in claim 1, further comprising a reset circuit coupled to the monolithic chip for providing a reset signal thereto, for initializing the monolithic chip.

3. The test device for testing stability of at least one computer as described in claim 1, further comprising a crystal oscillator circuit coupled to the monolithic chip for providing an impulse signal thereto.

4. The test device for testing stability of at least one computer as described in claim 1, wherein the switch module comprises two chips, each chip comprises four input pins and four pairs of output pins, the output port of the monolithic chip comprise 8 pins respectively connected to the input pins of the two chips.

5. The test device for testing stability of at least one computer as described in claim 4, wherein the switch module is connected to the computer via a first connector, the first connector comprises 8 pairs of pins respectively connected to the corresponding output pins of the two chips.

6. The test device for testing stability of at least one computer as described in claim 4, wherein the monolithic chip is connected to the computer via a second connector, the second connector comprises 8 pins respectively connected to the 8 pins of the output port of the monolithic chip.

7. The test device for testing stability of at least one computer as described in claim 1, wherein the input port of the monolithic chip comprises 8 pins, each pin connected to an anode of a light emitting diode, a cathode of the light emitting diode coupled to ground.

8. The test device for testing stability of at least one computer as described in claim 1, wherein the monolithic chip is an AT89S51 chip.

9. The test device for testing stability of at least one computer as described in claim 1, wherein the in-system programming module is capable of editing the testing control module by changing the retaining time of the signal for starting up/shutting down the computers, the shift time between the starting signal and shutting down signal, and loop times.

* * * * *